United States Patent
Brown et al.

(12) 
(10) Patent No.: US 6,513,184 B1
(45) Date of Patent: Feb. 4, 2003

(54) PARTICLE ENTRAPMENT SYSTEM

(75) Inventors: Colin W. Brown, Egham (GB); Edward Francis, Racine County, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 86 days.

(21) Appl. No.: 09/605,944

(22) Filed: Jun. 28, 2000

(51) Int. Cl.[7] .................. A47L 13/16; A47L 13/20; B32B 3/26; B32B 27/12

(52) U.S. Cl. ................... 15/231; 134/6; 442/97; 442/289; 442/397; 428/304.4

(58) Field of Search .............. 15/1.51, 208, 209.1, 15/231; 134/6; 442/97–100, 117, 286, 289, 394, 397; 428/137, 195

(56) References Cited

U.S. PATENT DOCUMENTS

| | | | |
|---|---|---|---|
| 2,724,457 A | | 11/1955 | Besser |
| 2,740,184 A | | 4/1956 | Thomas |
| 2,902,395 A | * | 9/1959 | Hirschy et al. |
| 2,986,524 A | | 5/1961 | Padgett |
| 3,099,855 A | * | 8/1963 | Nash |
| 3,118,022 A | | 1/1964 | Sessler et al. |
| 3,144,671 A | | 8/1964 | Gould et al. |
| 3,193,912 A | | 7/1965 | Polin |
| 3,240,212 A | | 3/1966 | Royster |
| 3,301,786 A | | 1/1967 | Klass |
| 3,307,332 A | | 3/1967 | Grace et al. |
| 3,316,620 A | | 5/1967 | Stewart, Jr. |
| 3,354,373 A | | 11/1967 | Fatovic |
| 3,449,094 A | | 6/1969 | Baxt et al. |
| 3,458,713 A | | 7/1969 | Perlman et al. |
| 3,463,168 A | | 8/1969 | Troll et al. |
| 3,485,708 A | | 12/1969 | Ballou et al. |
| 3,487,610 A | | 1/1970 | Brown et al. |
| 3,494,821 A | | 2/1970 | Evans |
| 3,496,013 A | | 2/1970 | Baxt et al. |

(List continued on next page.)

FOREIGN PATENT DOCUMENTS

| | | |
|---|---|---|
| EP | 0 375 234 | 6/1990 |
| EP | 0 423 619 A1 | 4/1991 |
| EP | 0 721 760 A1 | 7/1996 |
| EP | 0 774 229 A2 | 5/1997 |
| EP | 0 865 755 A1 | 9/1998 |
| EP | 0 872 206 A1 | 10/1998 |
| EP | 0 945 251 | 9/1999 |
| GB | 292479 | 6/1929 |
| GB | 2 069 327 A | 8/1981 |
| JP | 63-48981 | 10/1988 |
| JP | 5-25763 | 2/1993 |
| JP | 10262883 A | 10/1998 |

OTHER PUBLICATIONS

Author unknown, *Early History of Electrets*, 1 page, (Undated).
Bhatnagar et al., *Electrical Conductivity of Carnauba Wax Using Different Electrodes*, pp. 20–24, (1954).
Gemant, *Phil. Mag. S. 7., 20*, Recent Investigations on Electets, pp. 929–951, (1935).
Gross, *State of the Arts Review, 6*, "Electret Devices For Air Pollution Control", pp. 1–10, (1972).
Gross, pp. 115–119 (Undated).
Gutmann, *Reviews of Modern Physics, 20*, "The Electret", pp. 457–472, (1948).
Scotch Brite™ Lens Cleaning Cloth Label, 1 sheet, (On sale at least by Jun. 1, 2000).

*Primary Examiner*—Terrence R. Till

(57) ABSTRACT

A cleaning sheet for cleaning and removing particles from a surface is disclosed. The sheet includes a particle retention layer including an electret material for collecting and retaining the particles. The sheet also includes an outer layer covering at least a portion of the particle retention layer. The outer layer comprises a low dust retention material and includes a surface having a plurality of apertures formed therethrough.

28 Claims, 5 Drawing Sheets

U.S. PATENT DOCUMENTS

| | | |
|---|---|---|
| 3,496,461 A | 2/1970 | Sessler et al. |
| 3,571,679 A | 3/1971 | Turnhout |
| 3,612,778 A | 10/1971 | Murphy |
| 3,616,157 A | 10/1971 | Smith |
| 3,632,443 A | 1/1972 | Kodera et al. |
| 3,644,605 A | 2/1972 | Sessler et al. |
| 3,965,518 A | 6/1976 | Muoio |
| 3,965,519 A | 6/1976 | Hermann |
| 3,968,790 A | 7/1976 | Fukada et al. |
| 4,095,303 A | 6/1978 | Armstrong et al. |
| 4,144,370 A | 3/1979 | Boulton |
| 4,172,172 A | 10/1979 | Suzuki et al. |
| 4,232,128 A | 11/1980 | Michel et al. |
| 4,276,338 A | 6/1981 | Ludwa et al. |
| 4,333,021 A | 6/1982 | Cresap et al. |
| 4,352,846 A | 10/1982 | Pässler et al. |
| 4,355,021 A | 10/1982 | Mahl et al. |
| 4,436,780 A * | 3/1984 | Hotchkiss et al. |
| 4,486,365 A | 12/1984 | Kliemann et al. |
| 4,525,411 A * | 6/1985 | Schmidt |
| 4,603,069 A | 7/1986 | Haq et al. |
| 4,612,237 A | 9/1986 | Frankenburg |
| 4,845,512 A | 7/1989 | Arway |
| 4,874,659 A | 10/1989 | Ando et al. |
| 4,906,513 A | 3/1990 | Kebbell et al. |
| 4,993,099 A | 2/1991 | Emura et al. |
| 5,057,710 A | 10/1991 | Nishiura et al. |
| 5,310,590 A | 5/1994 | Tochacek et al. |
| 5,429,848 A | 7/1995 | Ando et al. |
| 5,486,411 A | 1/1996 | Hassenboehler. Jr. et al. |
| 5,525,397 A * | 6/1996 | Shizuo et al. |
| 5,616,408 A | 4/1997 | Oleszczuk et al. |
| 5,671,498 A | 9/1997 | Martin et al. |
| 5,690,719 A * | 11/1997 | Hodge |
| 5,706,804 A | 1/1998 | Baumann et al. |
| 5,725,927 A * | 3/1998 | Zilg et al. |
| 5,726,107 A | 3/1998 | Dahringer et al. |
| 5,817,584 A | 10/1998 | Singer et al. |
| 5,830,810 A | 11/1998 | Cohen |
| 5,834,384 A | 11/1998 | Cohen et al. |
| 5,871,845 A | 2/1999 | Dahringer et al. |
| 5,895,504 A | 4/1999 | Sramek et al. |
| 5,956,798 A | 9/1999 | Nemoto et al. |
| 6,054,071 A | 4/2000 | Mikkelsen, Jr. |
| 6,110,260 A * | 8/2000 | Kubokawa |
| 6,234,909 B1 * | 6/2001 | Graham et al. |
| 6,245,413 B1 * | 6/2001 | Kenmochi et al. |
| 6,305,046 B1 * | 10/2001 | Kingry et al. |

* cited by examiner

PARTICLE ENTRAPMENT SYSTEM

BACKGROUND

Dust cloths for removing dust from a surface to be cleaned, such as a table, are generally known. Such known dust cloths are typically made of woven or nonwoven fabrics and are often sprayed or coated with a wet, oily substance for retaining the dust. However, such known dust cloths tend to leave an oily film on the surface after use.

Other known dust cloths include nonwoven entangled fibers having spaces between the entangled fibers for retaining the dust. The entangled fibers are typically supported by a network grid or scrim structure, which can provide additional strength to such cloths. However, such cloths can become saturated with the dust during use (i.e., dust buildup) and/or may not be completely effective at picking up dense particles, large particles or other debris.

Accordingly, it would be advantageous to provide a cleaning sheet that can pick up and retain dust and debris. It would also be advantageous to provide a cleaning sheet that inhibits debris buildup on the exterior surface of the sheet by providing an exterior surface that does not substantially attract or retain debris thereon. It would also be advantageous to provide a cleaning sheet that attracts debris without the use of an oily spray. It would also be advantageous to provide a cleaning sheet that retains relatively large and/or denser particles of debris. These and other advantages of the present invention will become apparent to those who review this disclosure and appended claims.

SUMMARY

The present invention relates generally to the field of cleaning sheets, such as for use in cleaning surfaces (e.g., in the home or work environment). More particularly, the invention relates to a cleaning sheet for collecting and retaining dust, larger particles and/or other debris.

A particle entrapment system or cleaning sheet is provided. The cleaning sheet is useful for cleaning and removing particles and other debris from a surface such as a table, floor, article of furniture or the like. The cleaning sheet may include a number of layers or sheets to increase debris retention and/or strength. The sheet may include a particle retention layer (e.g., base layer) including electret material for collecting and retaining the particles. The sheet may also include an outer layer (e.g., cover layer) covering at least a portion of the particle retention layer. The cover layer generally includes a plurality of apertures, which allow the debris to be forced and/or attracted therethrough. The apertures may make up a substantial portion of the cover layer, and may typically have a cross-sectional area of at least about 1 mm$^2$. Examples of suitable cover layers include materials having a plurality of apertures with an average cross-sectional dimension of about 1 to about 10 mm. The cover layer is commonly formed from a low dust retention material (e.g., perforated sheets formed from polytetrafluoroethylene ("PTFE")). The cover layer comprises a low dust retention material and includes a surface having a plurality of apertures formed therethrough.

Cleaning utensils incorporating the cleaning sheet are also provided. The utensil may include a cleaning head adapted for coupling to the cleaning sheet. The cleaning sheet(s) may also be packaged as part of a cleaning utensil kit for cleaning surfaces. The kit may include a cleaning head adapted for coupling to the sheet and a handle adapted for coupling to the cleaning head.

A method of cleaning a surface is also provided. The method includes contacting a surface to be cleaned with the cleaning sheet. The debris from the surface to be cleaned may be drawn and/or pulled through the apertures of the cover layer and retained and/or collected by the cleaning sheet.

The cleaning sheet typically has a relatively low overall breaking strength in order to preserve a relative amount of flexibility. The term "breaking strength" as used in this disclosure means the value of a load (i.e., the first peak value during the measurement of the tensile strength) at which the cleaning sheet begins to break when a tensile load is applied to the cleaning sheet. The breaking strength of the sheet should, however, be high enough to prevent "shedding" or tearing of the cleaning sheet during use. The breaking strength of the cleaning sheet is typically at least 500 g/30 cm and cleaning sheets with breaking strengths of 1,500 g/30 cm to 4,000 g/30 cm are quite suitable for use with the cleaning implements described herein.

When intended to be used with a cleaning utensil, mounting structure or the like, the cleaning sheet typically has a relatively low overall elongation to assist in resisting "bunching" or "puckering" of the cleaning sheet. The term "elongation" as used in this disclosure means the elongation percentage (%) of the cleaning sheet when a tensile load of 500 g/30 mm is applied. For example, when designed to be used in conjunction with a mop or similar cleaning implement where the cleaning sheet is fixedly mounted, the present cleaning sheets typically have an elongation of no more than about 25% and, preferably, no more than about 15%.

The terms "surface" and "surface to be cleaned" as used in this disclosure are broad terms and are not intended as terms of limitation. The term surface as used in this disclosure includes substantially hard or rigid surfaces (e.g., articles of furniture, tables, shelving, floors, ceilings, hard furnishings, household appliances, and the like), as well as relatively softer or semi-rigid surfaces (e.g., rugs, carpets, soft furnishings, linens, clothing, and the like).

The term "debris" as used in this disclosure is a broad term and is not intended as a term of limitation. In addition to dust and other fine particulate matter, the term debris includes relatively large-sized particulate material, e.g., having an average diameter greater than about 1 mm, such as large-sized dirt, food particles, crumbs, soil, sand, lint, and waste pieces of fibers and hair, which may not be collected with conventional dust rags, as well as dust and other fine particulate matter.

Throughout this disclosure, the text refers to various embodiments of the cleaning sheet. The various embodiments described are intended to provide a variety of illustrative examples and should not be construed as descriptions of alternative species. The descriptions of the various embodiments may be of overlapping scope. The various embodiments discussed are merely illustrative and are not meant to limit the scope of the present invention.

DETAILED DESCRIPTION

Figure 1:
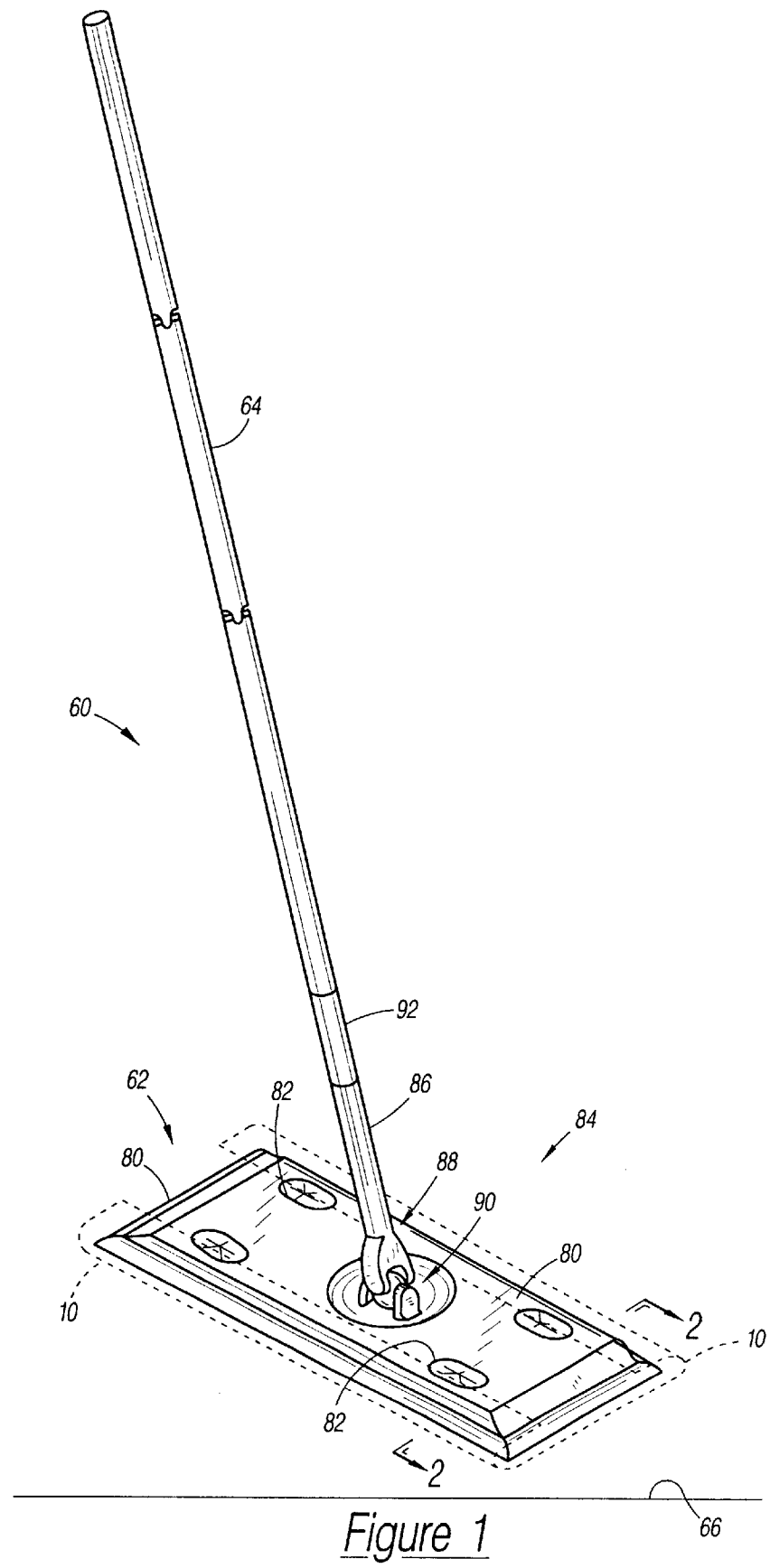
FIG. 1 is a perspective view of a cleaning utensil according to an exemplary embodiment.

One example of a cleaning sheet (show as a dusting pad 10) for collecting, attracting and retaining particulate matter and other debris (e.g., dust, soil, other airborne matter, lint, hair, etc.) is shown in FIG. 1. Pad 10 includes an "electret" base or core particle retention layer 30 permanently charged with an electrostatic force for attracting (e.g., collecting) and retaining particulate matter (shown as debris 68 in FIG. 2). Debris 68 is drawn and/or pulled through apertures (shown as holes 22) in an outer or cover layer 20 attached to pad 10 when pad 10 is moved along a surface to be cleaned (shown as a work surface 66 in FIG. 7). Pores (shown as cavities 34) of core 30 retain and/or entrain debris 68 within cavities 32 of pad 10.

The particulate matter may be further retained by a cover layer, which covers or surrounds at least a portion of the electret material, to "trap" and retain the particulate matter in the electret material. Cover layer 20 may be made of a material that has a relatively low debris retention capacity (i.e., that does not significantly attract or collect the debris), and generally has a lower debris retention than the core, so the exterior surface of cover layer 20 remains substantially free of debris 68. Examples of exemplary materials that do not significantly collect dust include perforated sheets formed from polytetrafluoroethylene. Typically, the cleaning sheet is configured to retain no more than about 10 g/m$^2$ of particulate matter, more suitably no more than about 1 to 5 g/m$^2$.

Particle Retention Layer

Figure 2:
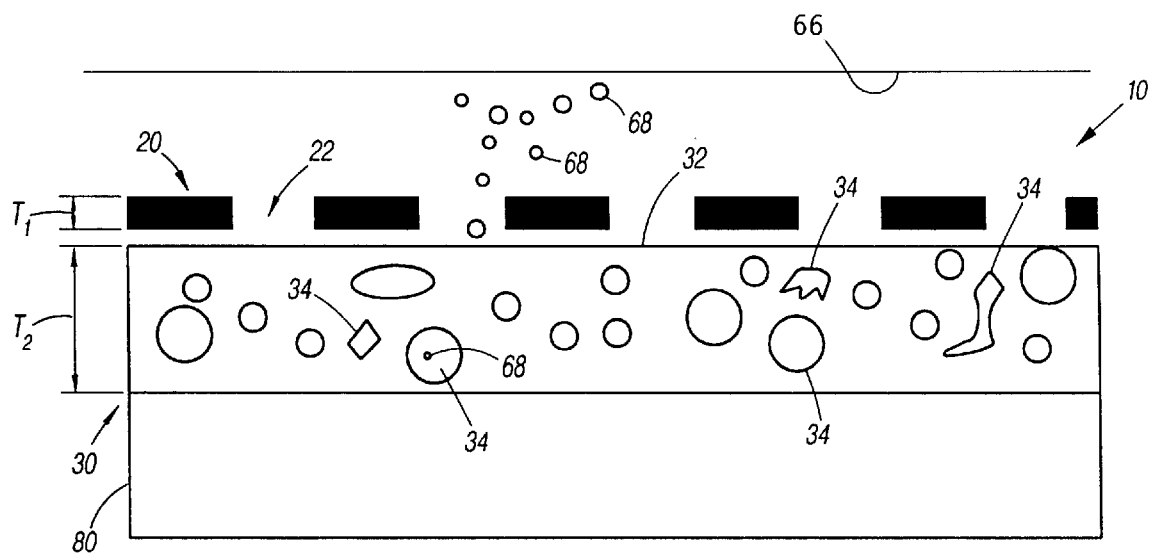
FIG. 2 is a cross—sectional view of a cleaning sheet taken along line 2—2 of FIG. 1 according to an exemplary embodiment.

Core 30 includes a particle retention surface 32 located within pad 10 adjacent cover layer 20. Cavities 34 of particle retention surface 32 trap, collect and retain a significant amount of debris 68. For example, the debris may be embedded against a wall of the cavity. According to suitable embodiments, the particle retention layer may be a shaped fabric, a continuous sheet of flexible material, or multiple sheets of material. Referring to FIG. 2, cavities 34 can be formed from pores randomly distributed in core 30. Cavities 34 may be any shape or conbination of shapes such as rounded, jagged, irregular, etc. as shown in FIG. 2. For example, the cavities may be rectangular, star, oval, or irregular shaped. The cavities may be disposed in a regular pattern, as depicted in FIG. 3 and may be randomly arranged.

The size and depth of the cavities should preferably be large enough to create a sufficient sized "pocket" to keep entrained debris from scratching or damaging the surface being cleaned. The cavities are preferably not so deep, however, that it is difficult for debris to be brought into contact with the cavity. The cavities typically have an average width in the range of about 1 to 10 mm, more suitably 2 to 5 mm, depending in part on the size of the particles intended to be retained. The cavities typically have an average depth in the range of about 0.1 to 5 mm, more suitably 1 to 3 mm.

Figure 3:
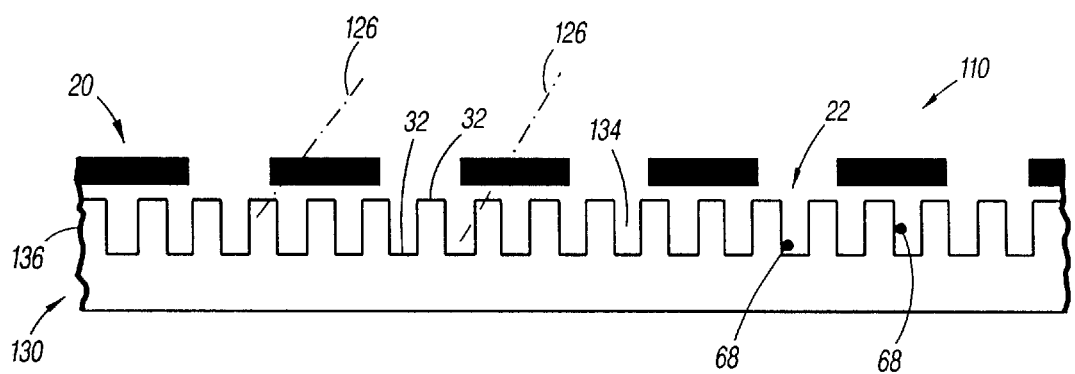
FIG. 3 is a fragmentary partially exploded sectional view of a cleaning sheet according to another exemplary embodiment.

FIG. 3 shows a sectional view of a pad 110, an exemplary embodiment of the cleaning sheet. Pad 110 differs substantially from pad 10 in one respect: the structure of core 30 is changed. Other than this modification, the construction, performance and function of pad 110 shown in FIG. 3 is substantially the same as pad 10, and like reference numerals are used to identify like elements. A core 130 of pad 110 is textured to form the pores (shown as depressions 134). Protrusions (shown as outwardly extending, flexible, semi-rigid fmgers 136) extend from core 130 toward cover layer 20. Fingers 136 are generally rectangular shaped, but may be of other shapes (e.g., zigzag, rounded, wave-like, etc.) according to other embodiments. Fingers 136 are shown arranged in a row-like pattern, but may be arranged in other patterns or configurations (e.g., circular, random, etc.) according to other suitable embodiments. Fingers 136 define depressions 134 for retaining debris 68 (e.g., between two protrusions). When inside depressions 134, debris 68 is substantially prevented from escaping the interior of pad 110 by cover layer 20.

Figure 4:
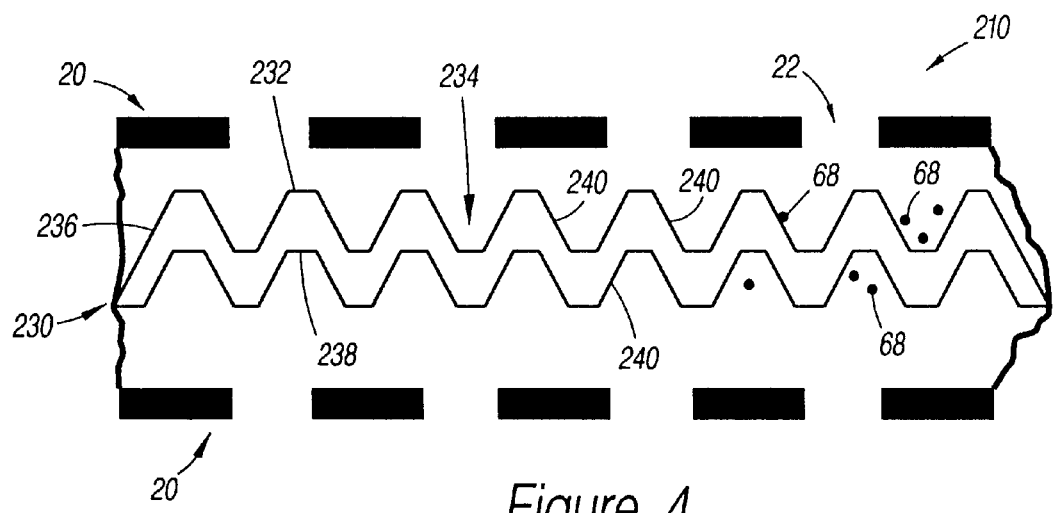
FIG. 4 is a fragmentary partially exploded sectional view of a cleaning sheet according to another exemplary embodiment.

FIG. 4 shows a pad 210, another exemplary embodiment of the cleaning sheet. Pad 210 differs substantially from pad 10 in two respects: the structure of core 30 is changed, and the material of core 30 is changed. Other than these modifications, the construction, performance and function of pad 210 is substantially the same as pad 10, and like reference numerals are used to identify like elements. A core 230 of pad 210 is shaped (e.g., as a sinusoidal wave) to form the pores (shown as depressions 234) for retaining debris 68. A top cover layer 20 "sandwiches" or presses core 230 against a bottom cover layer 20. Protrusions (shown as projections 236) extend from core 230 to form depressions 234. Projections 236 are generally blunt shaped and include an inclined or sloping wall 240. The sloping shape of projections 236 provides additional surface area in depressions 234 for collecting and retaining debris 68. As shown in FIG. 4, projections 236 are arranged in a row-like or corrugated pattern. Projections 236 of a top particle retention surface 232 are shown arranged in an alternating pattern, such that projections 236 of surface 232 correspond to depressions 234 of a bottom particle retention surface 238. According to other suitable embodiments, the protrusions (i.e., projections) and the pores (i.e., depressions) may be arranged in a variety of other patterns (e.g., protrusions of the top particle retention surface corresponding to the protrusions of the bottom particle retention surface and arranged in a row-like or wave-like manner). According to other suitable embodiments (as shown in FIGS. 4 and 5) the particle retention layer (i.e., core) includes at least two sides, and the pores (i.e., cavities) are arranged on each side of the particle retention layer.

Figure 5:
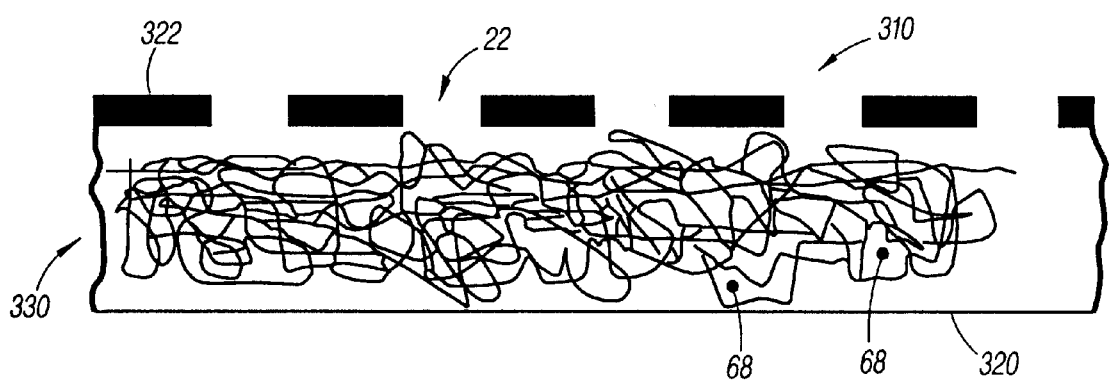
FIG. 5 is a fragmentary partially exploded sectional view of a cleaning sheet according to another exemplary embodiment.

FIG. 5 shows a pad 310, another exemplary embodiment of the cleaning sheet. Pad 310 differs substantially from pad 10 in two respects: the structure of core 30 is changed, and the material of core 30 are changed. Other than these modifications, the construction, performance and function of pad 310 is substantially the same as pad 10, and like reference numerals are used to identify like elements. Core 330 of pad 310 is shown made of an entangled network of nonwoven fibers. The pores for trapping the debris are formed by the spaces between the entangled fibers (i.e., the debris is retained between the fibers that form the core).

According to other suitable embodiments, the core may be made from a variety of combinations of materials formed in a variety of structures.

The term "nonwoven" as used in this disclosure includes a web having a structure of individual fibers or threads which are interlaid, but not necessarily in a regular or identifiable manner as in a knitted fabric. The term also includes individual filaments and strands, yarns or tows as well as foams and films that have been fibrillated, apertured, or otherwise treated to impart fabric-like properties. Nonwoven fabrics or webs have been formed from many processes such as for example, meltblowing processes, spunbonding processes, and bonded carded web processes. The basis weight of nonwoven fabrics is usually expressed in ounces of material per square yard ("osy") or grams per square meter ("gsm") and the fiber diameters useful are usually expressed in microns. Basis weights can be converted from osy to gsm simply by multiplying the value in osy by 33.91. (According to another suitable embodiment, the fibers may be woven.)

Figure 6:
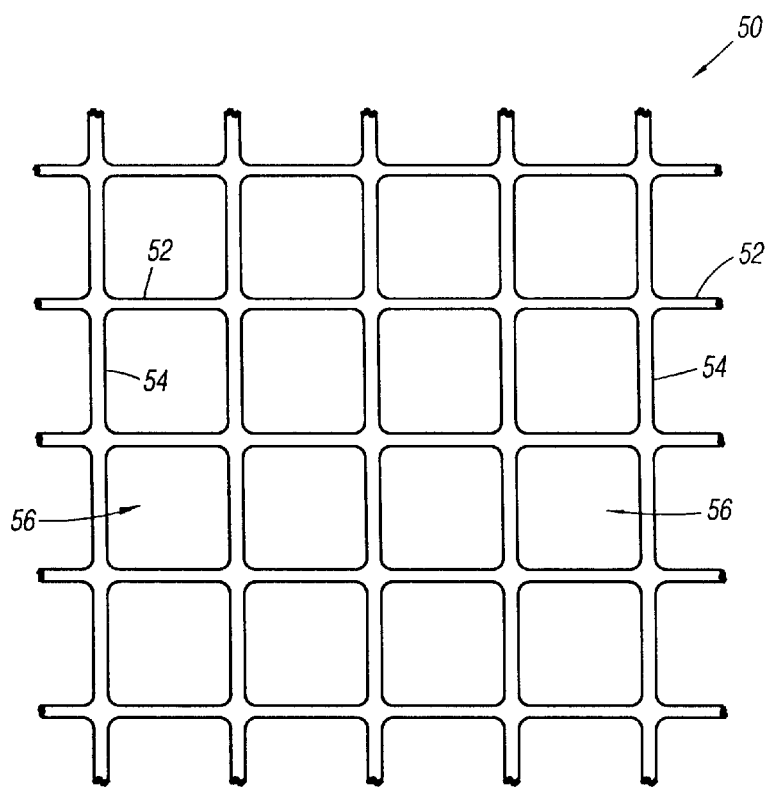
FIG. 6 is a top plan view of a scrim according to a suitable embodiment.

According to an exemplary embodiment, a web or lattice (shown as a scrim 50 in FIG. 6) may support the fibers of a non-woven sheet. This allows the production of sheets which have a relatively low entanglement coefficient (e.g., no more than about 800 m) while retaining sufficient strength to be used for cleaning. As shown in FIG. 5, scrim may be integrally embedded within the fibers to form a unitary support structure. In FIG. 6 scrim 50 includes a net having horizontal members 52 attached to vertical members 54 arranged in a "network" configuration. Spaces (shown as holes 56) are formed between vertical members 54 and horizontal members 52 to give scrim 50 a mesh or lattice-like structure. According to various embodiments, the horizontal and vertical members of the scrim may be connected together in a variety of ways such as woven, spot welded, cinched, tied, etc. The average diameter of holes 56 generally falls within the range of 20 to 500 mm, and more suitably between 100 to 200 mm. The distance between the fibers typically falls within about 2 to 30 mm, and more suitably within about 4 to 20 mm. Alternatively, the nonwoven sheet may be reinforced by filaments embedded in the sheet which are held in place simply by the mechanical forces resulting from hydroentangling microfibers around the filaments.

To attach the fibers to scrim 50 (thereby forming pad 310 as a unitary piece), the fibers may be overlaid on each side of scrim 50. A low pressure water jet may be subsequently applied to entangle the fibers to each other and to scrim 50 (i.e., hydroentanglement) to form a relatively lose entanglement of nonwoven fibers. Hydroentanglement of the fibers may be further increased during removal (e.g., drying) of the water from the water jet. The fibers may also be attached to the web (i.e., scrim) by a variety of other conventional methods (e.g., air laid, adhesive, woven, etc.). The fibers are typically entangled onto the web to form a unitary body, which assists in preventing "shedding" of the fibers from the web during cleaning. The web may be formed from a variety of suitable materials, such as polypropylene, nylon, polyester, etc. An exemplary web (i.e., scrim) is described in U.S. Pat. No. 5,525,397, the disclosure of which is hereby incorporated by reference.

The degree of entanglement of the fibers in the core can be measured by an "entanglement coefficient". The entanglement coefficient is also referred to as the "CD initial modulus." The term "entanglement coefficient" as used in this disclosure refers to the initial gradient of the stress-strain curve measured with respect to the direction perpendicular to the fiber orientation in the fiber aggregate (cross machine direction). (The term "stress" as used in this disclosure means a value which is obtained by dividing the tensile load value by the chucking width (i.e., the width of the test strip during the measurement of the tensile strength) and the basis weight of the nonwoven fiber aggregate. The term "strain" as used in this disclosure is a measure of the elongation of the cleaning sheet material.)

Suitable nonwoven fiber aggregates for use in forming the present cleaning sheets have an entanglement coefficient in the range of about 20 to 500 m (as measured after any reinforcing filaments or network has been removed from the nonwoven fibrous web) and, more typically, no more than about 250 m. A small value of the entanglement coefficient generally represents a smaller degree of entanglement of the fibers. The entanglement coefficient may be controlled in part by selection of the type and quantity of fibers, the weight of the fibers, the amount and pressure of the water, etc. See U.S. Pat. No. 5,525,397 at col. 4, line 52-col. 5, line 26 discussing entanglement.

The core (e.g., core 330 shown in FIG. 5) may include a nonwoven aggregate layer having fibers with a large degree freedom and sufficient strength, which may be advantageous for effectively collecting and retaining dust and larger particulates within the cleaning sheet. In general, a nonwoven fabric formed by the entanglement of fibers involves a higher degree of freedom of the constituent fibers than in a nonwoven fabric formed only by fusion or adhesion of fibers. The nonwoven fabric formed by the entanglement of fibers can exhibit better dust collecting performance through the entanglement between dust and the fibers of the nonwoven fabric. The degree of the entanglement of fibers can have a large effect on the retention of dust. That is, if the entanglement becomes too strong, the freedom of fibers to move will be lower and the retention of dust is generally decreased. In contrast, if the entanglement of the fibers is very weak, the strength of the nonwoven fabric can be markedly lower, and the processability of the nonwoven fabric may be problematic due to its lack of strength. Also, shedding of fibers from the nonwoven fabric is more likely to occur from a nonwoven aggregate with a very low degree of entanglement.

A suitable nonwoven aggregate for use in producing the present cleaning sheet can be formed by hydroentangling a fiber web (with or without embedded supporting filaments or a network sheet) under relatively low pressure. For example, the fibers in a carded polyester nonwoven web can be sufficiently entangled with a network sheet by processing the nonwoven fiber webs with water jetted at high speed under 25-50 kg/cm$^3$ of pressure. The water can be jetted from orifices positioned above the web as it passes over substantially smooth non-porous supporting drum or belt. The orifices typically have a diameter ranging between 0.05 and 0.2 mm and can be suitably arranged in rows beneath a water supply pipe at intervals of 2 meters or less.

In cases where the entanglement coefficient of the fiber aggregate is to be set at a value not greater than 800 m, it may be difficult for a sheet, which is constituted only of a fiber aggregate, to achieve the values of sufficient breaking strength and the elongation. By entangling the fibers to scrim 50 into a unitary body, and the elongation of this layer is kept low and its processability can be enhanced. Shedding of the fibers from the cleaning sheet can often be markedly prevented as compared with a conventional entangled sheet, which is constituted only of a fiber aggregate in approximately the same entanglement state as that in the fiber aggregate of the cleaning sheet.

If the entanglement coefficient is too small (e.g., no more than about 10 to 20 m), the fibers will not be sufficiently entangled together. In addition, the entanglement between the fibers and the scrim will likely be poor as well. As a result, shedding of the fibers may occur frequently. If the entanglement coefficient is too large (e.g., greater than about 700 to 800 m), a sufficient degree of freedom of the fibers cannot be obtained due to too strong entanglement. This can prevent the fibers from easily entangling with dust, hair and/or other debris, and the cleaning performance of the sheet may not be satisfactory.

The cleaning sheet typically includes a nonwoven fiber aggregate as a core layer having a relatively low basis weight. The basis weight of the nonwoven fiber aggregate generally falls within the range of 30 to 100 g/m² and, typically is no more than about 75 g/m². If the basis weight of the nonwoven fiber aggregate is less than 30 g/m², dust may pass too easily through the nonwoven fiber aggregate during the cleaning operation and its dust collecting capacity may be limited. If the basis weight of the nonwoven fiber aggregate is too large (e.g., substantially greater than about 150 g/m²), the fibers in the nonwoven fiber aggregate (if any) generally may not be sufficiently entangled with each other to achieve a desirable degree of entanglement. In addition, the processability of the nonwoven fiber aggregate can worsen, and shedding of the fibers from the cleaning sheet may occur more frequently. The denier of the fibers in the nonwoven fiber aggregate, the length, the cross-sectional shape and the strength of the fibers used in the nonwoven fiber aggregate are generally determined with an eye toward processability and cost, in addition to factors relating to performance.

The cleaning sheet typically includes an outer nonwoven fiber layer or net/web which has a relatively low basis weight as an outer fabric layer (i.e., the material on the cleaning surface of the sheet). According to a particularly suitable embodiment, the nonwoven layer or net has a basis weight in the range of about 20 to 150 g/m², preferably 30 to 75 g/m². A low basis weight can assist in providing a "stream-line" or compact look and feel to the cleaning sheet. The basis weight of the cleaning sheet may be about 50 to 250 g/m² (or greater or lesser depending on the intended use for the cleaning sheet).

The cleaning sheet may include a nonwoven fabric formed from fibers or microfibers. The term "denier" as used in this disclosure is defined as the weight in grams of a 9000 meter length of fiber. The denier of the fibers of the particle retention layer is suitably about 0.1-6.0, more suitably about 0.5-3.0.

Electrostatic Properties of the Particle Retention Layer

The core is preferably rendered electret (i.e., has a substantially permanent electrostatic charge) to enhance its ability to attract, collect, trap and retain the debris. This is because electret materials are believed to actively electrostatically attract the debris during the cleaning process and may provide a sufficient force to attract the debris. Non-electret cloths typically only physically contact the debris, with the debris adhering to, or being enveloped by, the conventional non-electret cloth. According to other suitable embodiments, the particle retention layer may be temporarily charged with an electrostatic force Electret materials, also generally referred to as an electret, include dielectric materials that retain an electrostatic charge for a prolonged period. Without intending to be limited to any particular theory, it is believed that electret materials are a permanent source of an electric field. Electrets are usually produced in a sheet or film form (or as a fiber) with one surface positively charged and the other surface negatively charged. When an electret is formed, the material is believed to be "polarized" (i.e., the charges have been oriented in a preferred direction". Such polarization can involve heterocharges, homocharges, or both, depending on the material used and the method of preparation. For additional information on electret materials, see Bernard Gross, "Electret Devices for Pollution Control", State of the Art Review, Vol. 6, Optosonic Press 1972 (discussing the properties of electret materials), U.S. Pat. No. 5,057,710 issued to Nishiura et al. (discussing a method for preparing electret materials), U.S. Pat. No. 5,429,848 issued to Ando et al. (disclosing electret tubular nonwoven fabric formed by catching the fibers carried by a fluid in a DC field), U.S. Pat. No. 5,726,107 (discussing a nonwoven electret fiber mixture including at least two types of electret fibers made from different materials), U.S. Pat. No. 4,486,365 (discussing a process and apparatus for the preparation of electret filaments, textile fibers and similar articles), the disclosure of each which is hereby incorporated by reference.

Materials of the Particle Retention Layer

The fibers used in the core are typically formed from thermoplastic materials. Thermoplastics materials are believed to retain an electrostatic charge for long periods, have relatively good insulating properties, and may be formed in a roll film, which permits continuous charging techniques. The fibers may also include semi-synthetic fibers (such as acetate fibers), regenerated fibers (such as cupra and rayon), natural fibers (such as cotton and blends of cotton), and other fibers or combinations of natural or synthetic fibers.

The base layer (i.e., core) may also be made of a porous sponge or foam as shown in FIG. 2. Suitable foams include polyurethane foams and latex foams. Such foams are typically prepared by using a blowing agent that reacts with a chemical to generate a gas (e.g., carbon dioxide), which is trapped as bubbles during a polymerization process, thereby forming the foam. Other suitable foams include phenolic resin foams. Phenolic resin foams are typically prepared by reacting phenol and formaldehyde in the presence of a basic catalyst, such as sodium hydroxide or potassium hydroxide, followed by neutralizing the solution and distilling off water. Such reaction is believed to produce resol (i.e., an A-stage resin) including reactive methol groups. The A-stage resin can by "cured" by reacting it further in the presence of an acid catalyst and in the presence of a blowing agent to form a phenolic resin. (During curing, some formaldehyde and water are typically liberated.) The reactive methol groups of the A-stage resin can react further to enlarge the polymeric chain length and/or cross-link to form a three-dimensional network.

The base layer (i.e., core) may be made of a fabric material (e.g., a continuous sheet) according to an exemplary embodiment as shown in FIG. 4. The fabric may be woven, such as those traditional textile fabrics made by weaving (i.e., the interlacing of two or more yarn sets at right angles on a loom), or by knitting (i.e., the interlooping of one or more yarns upon itself or themselves). According to a suitable embodiment as shown in FIG. 4, the fabric may be nonwoven. Nonwoven fabrics may be made by mechanically (such as by hydroentanglement), chemically or thermally interlocking layers or networks of fibers (or filaments or yarns). Nonwoven fabrics may also be made by interlocking fibers or filaments concurrent with their extrusion and/or by perforating relatively thin films.

The materials of the core may be rendered electret by any variety of known methods. For example, the core materials can be rendered electret by coating them with an electret material such as a wax. The core materials may also be rendered electret by spinning them in a strong electrostatic filed. The core materials may also be rendered electret by using triboelectret effects (i.e., inducing a charge by rubbing the fibers with other media). According to a suitable embodiment, at least 20% of the core materials are electret (by weight %), preferably 50–100%. The core materials have a charge suitably in the range of about $1.0 \times 10^{-11}$ to $1.0 \times 10^{-3}$ coulumbs/cm$^2$, more suitable $1.0 \times 10$ to $1.0 \times 10^{-3}$ coulumbs/cm$^2$. The core material may have the capacity to retain debris having a size of at least about 20 g/m$^2$. The density of the particle intended to be collected may be affected, in part, by the electric charge of the core. The core may include non-electret natural or synthetic fibers to increase the breaking strength and elongation of the core. Such non-electret fibers may include, but are not limited to wool, cotton, cellulose, polypropylene, polyethylene, polyester, polytetraflourine (PTE), nylon, rayon, acrylic, etc. and combinations thereof.

Outer or Cover Layer

Referring to FIG. 2, core 30 is shown covered or surrounded by cover layer 20, such that core 30 is not substantially in contact with surface 66. Cover layer 20 is substantially continuous and generally planar. According to an exemplary embodiment as shown in FIG. 4, core 30 may be located between a top cover layer 322 and a bottom or backing layer 320 in a "sandwich" or packed fashion. Cover layer 322 is a generally smooth and compliant (e.g., flexible) generally planar sheet for cleaning delicate surfaces (e.g., wood, glass, plastic, etc.) or hard surfaces. According to other suitable embodiments, a space or other intermediate layers may be positioned between the core and the cover layer or layers.

The backing layer may be more rigid and/or have a greater basis weight than the core or the cover layer to provide support and structure to the cleaning sheet. According to other suitable embodiments, a space or other intermediate layers may be positioned between the backing layer and the outer fabric layer. A variety of materials are suitable for use as a backing layer, as this layer has the desired degree of flexibility and is capable of providing sufficient support to the sheet as a whole. Examples of suitable materials for use as a backing layer include a wide variety of lightweight (e.g., having a basis weight of about 10 to 75 g/m$^2$), flexible materials capable of providing the sheet with sufficient strength to resist tearing or stretching during use. The backing layer is typically relatively thin, e.g., has a thickness of about 0.05 mm to about 0.5 mm, and can be relatively non-porous. Examples of suitable materials include spunbond and thermal bond nonwovens sheets formed from synthetic and/or natural polymers. Other backing materials which can be utilized to produce the present cleaning sheets include relatively non-porous, flexible layers formed from polyester, polyamide, polyolefin or mixtures thereof. The backing layer could also be made of hydroentangled nonwoven fibers if it meets the performance criteria necessary for the particular application. One specific example of a suitable backing layer is a spun bond polypropylene sheet with a basis weight of about 20 to 50 g/m$^2$.

Figure 8:
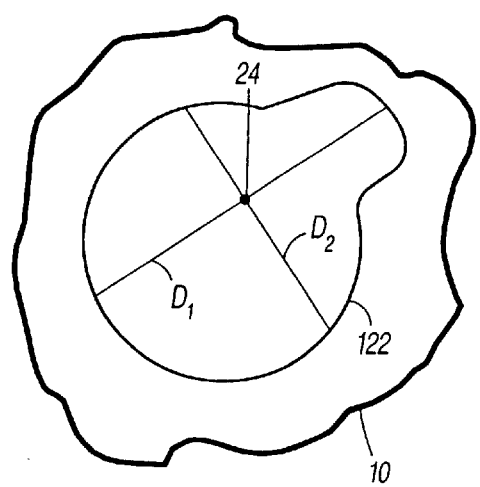
FIG. 8 is a fragmentary top plan view of a hole of a cleaning sheet according to a suitable embodiment of the present invention.
Figure 7:
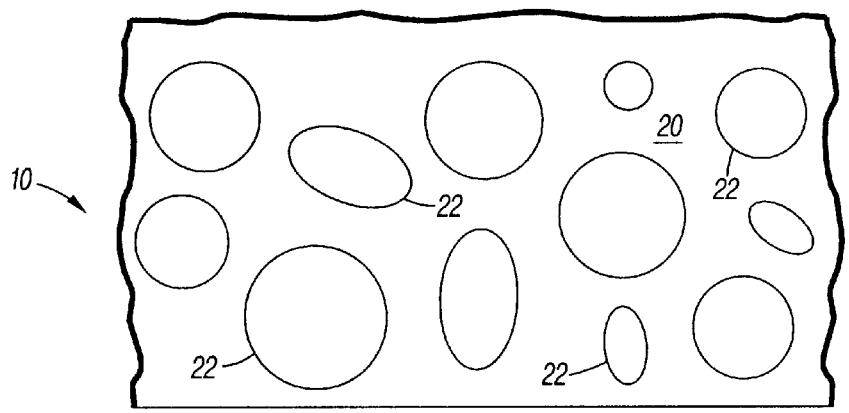
FIG. 7 is a fragmentary top plan view of the cleaning sheet according to a suitable embodiment.

As shown in FIG. 5, holes 22 may be integrally formed in cover layer 322, which may be a continuous sheet of material. The holes may be circular shaped (as shown in FIG. 7), but may be other shapes (e.g., rectangular, star, oval, irregular, etc.) or combinations of shapes according to alternative embodiments. Hole 122, another embodiment of hole 22, is shown having an irregular shape in FIG. 8. According to a suitable embodiment, the holes may be formed by creating perforations in the cover layer. Holes 22 are generally of a sufficient size to allow significantly sized debris (e.g., up to 0.5–100 mm) to pass through to the particle retention layer. After passing through the holes, the debris flows in the pores (i.e., cavities) of the particle retention layer. Each of holes 22 has a major diameter $D_1$ greater than any other diameter of the hole, and a secondary diameter $D_2$, which is the greatest cross-sectional axis perpendicular to major diameter $D_1$ (see, e.g., FIG. 8). According to a suitable embodiment, the average major diameter of all of the holes may be in the range of about 1 to 10 mm, more suitably in the range of about 2 to 5 mm.

Each of holes 22 may have a cross-sectional dimension. The average cross-sectional dimension is equal to one-half of the sum of $D_1$ of the hole plus $D_2$ (i.e., average cross-sectional dimension=$(D_1+D_2)/2$). The average cross-sectional are of each of the holes is typically at least 1 mm$^2$, more typically in the range of about 1 to 100 mm$^2$, most suitably in the range of about 5 to about 25 mm$^2$. According to a suitable embodiment, the cross-sectional dimension of all the holes relative to the total surface area of the exterior surface of the cover layer is typically about 30% to 95% and more suitably 70% to 90%. The number of holes and the average cross-sectional dimension of the holes is selected to allow maximum amount of debris through the holes, while separating the core from the surface to be cleaned and maintaining the debris in the core.

The cover layer may be made of a material that has a low debris retention (i.e., that does not significantly attract or collect the debris) and generally has a lower debris retention than the core. According to a suitable embodiment, the cover layer may be made of a thermoplastic material. Thermoplastic materials or fibers may include, without limitation polyesters, polyamides and polyolefins, polypropylene, polyethylene, polystyrene, polycarbonate, nylon, rayon, acrylic, etc. and combinations thereof. The thermoplastic materials may be produced by a melt blown process. Other materials that do not significantly attract debris include fibrous woven and nonwoven fabrics having tightly packed fibers with a relatively high degree of entanglement coefficient. Still other such materials include non-fibrous materials such as a perforated polymer fibers or sheets. According to a suitable embodiment, the cover layer can be a spunbond or thermal bond polypropylene. According to other suitable embodiments, the cover layer may be made of natural materials (such as rubber, latex, and the like), as well as synthetic materials such as polyolefins (such as, polypropylene and polybutene), polyesters (such as polyethylene, polyurethane terephthalate and polybutylene terephthalate), polyamides (such as nylon 6 and nylon 66), acrylonitriles, vinyl polymers and vinylidene polymers (such as polyvinyl chloride and polyvinylidene chloride), and modified polymers, alloys or mixtures thereof, and other materials that have a relatively high dust retention capacity.

Coupling of the Cover Layer and the Particle Retention Layer

The cover layer may be attached to the core by a fastener such as melt bonding (shown as a stitch 126 in FIG. 3). The fastener is intended to function as a way to bond (physically and/or chemically) or otherwise secure the cover layer to the core. According to a suitable embodiment, an adhesive may attach the cover layer to the core. The adhesive should be of a type that is relatively soft and non-abrasive relative to the surface to be cleaned. The adhesive should also permit the debris to pass through the apertures of the cover layer and should not substantiality retain the debris. The adhesive may be applied as a solid layer, a continuous pattern (e.g., a circle or serpentine pattern), a discontinuous pattern (e.g., a series of lines of a matrix of dots), or any other desired pattern such as checkerboard, cross, crisscross, etc. The adhesive material may be applied to the cover layer, the core, or to any other suitable intermediary surface (if any) or backing layer. According to other suitable embodiments, the cover layer, in whole or in part, and the core may be welded together (e.g., ultrasonic, infrared, melt bonding of thermoplastic in localized locations, spot welding, etc.). According to still other suitable embodiments, the cover layer may be attached to the core by entanglement (e.g., hydro-entanglement) or by other fasteners (e.g., construction adhesives, clips, embossing, etc.).

Dimensions of the Cleaning Sheet

The physical dimensions of the cover layer and the core are generally not thought to be critical. The outer perimeter of cover layer 20 is typically larger than the outer perimeter of core 30, as shown in the FIGURES, so that debris 68 may pass through holes 22 of cover layer 20 before being retained in core 30. Cover layer 20, as shown in FIG. 2, has a thickness $T_1$ which is typically less than a thickness $T_2$ of core 30. By way of a non-limiting example, the cover layer can have an average thickness of up to about 1 mm, preferably 0.05 to 0.5 mm. The core can have an average thickness up to about 5 mm, preferably 1 to 2 mm. According to a suitable embodiment as shown in FIG. 1, cover layer 20 has a shape and configuration similar to that of core 30.

Cleaning Implements and Methods of Use

Pad 10 may be used alone (e.g., as a rag) or in combination with other implements and utensils to clean surface 66. Pad 10 is generally flexible for following any contour (e.g., smooth, jagged, irregular, creviced, etc.) of a surface 66 to be cleaned. Accordingly, pad 10 is particularly suitable for cleaning hard, rigid surfaces. According to another embodiment, pad 10 may be semi-rigid and particularly suitable for cleaning planar surfaces. Pad 10 may also be used to clean relatively soft surfaces such as carpets, rugs, upholstery and other soft articles.

Referring to FIG. 1 pad 10 is shown attached to a cleaning head 62 of a cleaning utensil (shown as a dust mop 60) according to an exemplary embodiment. Head 62 includes a carriage 80 providing a fastener (shown as a spring clip 82) for mounting pad 10. A mounting structure 84 attaches an elongate rigid member (shown as a segmented handle 64) is attached to carriage 80. Mounting structure 84 includes a yoke (shown as an arm 86) having a y-shaped end 88 pivotally mounted to a socket (shown as a ball joint 90). An adapter (shown as a connector 92) threadably attaches arm 86 to handle 64. According to suitable embodiments, the cleaning utensil may be a broom, brush, polisher, handle or the like adapted to secure the cleaning sheet. The cleaning sheet may be attached to the cleaning utensil by any of a variety of fasteners (e.g., friction clips, screws, adhesives, retaining fingers, etc.). According to other suitable embodiments, the cleaning sheet may be attached as a single unit, or as a plurality of sheets (e.g., strips or "hairs" of a mop).

The components of the cleaning utensil, namely the mounting structure, adapter and handle, may be provided individually or in combinations (e.g., as a kit or package). The components of the cleaning utensil may be readily, easily and quickly assembled and disassembled in the field (e.g., work site, home, office, etc.) or at the point of sale for compactablity and quick replacement. The cleaning utensil may also be provided in a pre-assembled and/or unitary condition. According to a suitable embodiment, the cleaning sheet is configured for use with the PLEDGE® GRAB™ sweeper (commercially available from S. C. Johnson & Son, Incorporated of Racine, Wis.).

To clean surface 66, pad 10 may be secured to head 62 of mop 60 by clip 82. Pad 10 is brought into contact with surface 66 and moved along surface 66 (e.g., in a horizontal direction, vertical direction, rotating motion, linear motion, etc.). Debris 68 from surface 66 is provided or attracted through holes 22 in cover layer 20. An electrostatic charge of an electret material in core 30 may pull or draw debris 68 through holes 22 of cover layer 20 and into core 30 (see FIG. 2). Pores (shown as cavities 34) of core 30 retain and/or entrain debris 68 within cavities 32 of pad 10. The exterior surface of cover layer 20 does not substantially attract or retain debris 68, so the exterior surface of cover layer 20 of pad 10 remains substantially free of debris 68. After use, pad 10 may be removed from mop 60 for disposal or cleaning (e.g., washing, shaking, removing debris, etc.). According to other suitable embodiments, the cleaning sheet may be used alone (e.g., hand held) to clean the surface.

Test Methods

Breaking Strength (Cross Machine Direction)

From each of the cleaning sheets, samples having a width of 30 mm may be cut out in the direction perpendicular to the fiber orientation in the sheet (i.e., in the cross machine direction). The sample may be chucked with a chuck-to-chuck distance of 100 mm in a tensile testing machine and elongated at a rate of 300 mm/min in the direction perpendicular to the fiber orientation. The value of load at which the sheet began to break (the first peak value of the continuous curve obtained by the stress/strain measurement) may be taken as the breaking strength.

Elongation at a Load of 500 g/30 mm

The elongation of a sample, at a load of 500 g in the measurement of the breaking strength in the cross machine direction described above, may be measured. For the purposes of this test, "elongation" is defined as the relative increase in length (in %) of a 30 mm strip of cleaning sheet material when a tensile load of 500 g is applied to the strip.

Entanglement Coefficient

The scrim may be removed from the nonwoven fiber aggregate. Where the scrim has a lattice-like net structure, this is typically accomplished by cutting the fibers which make up the network sheet at their junctures and carefully removing the fragments of the network sheet from the nonwoven fiber aggregate with a tweezers. A sample having a width of 15 mm may be cut out in the direction perpendicular to the fiber orientation in the sheet (i.e., in the cross machine direction). The sample may be chucked with a chuck-to-chuck distance of 50 mm in a tensile testing machine, and elongated at a rate of 30 mm/min in the direction perpendicular to the fiber orientation (in the cross machine direction). The tensile load value F (in grams) with respect to the elongation of the sample may be measured. The value, which is obtained by dividing the tensile load value F by the sample width (in meters) and the basis weight of the nonwoven fiber aggregate W (in $g/m^2$), is taken as the stress, S (in meters). A stress-strain curve is obtained by plotting stress ("S") against the elongation ("strain" in %) (i.e., stress S $[m]=(F/0.015)/W$).

Figure 9:
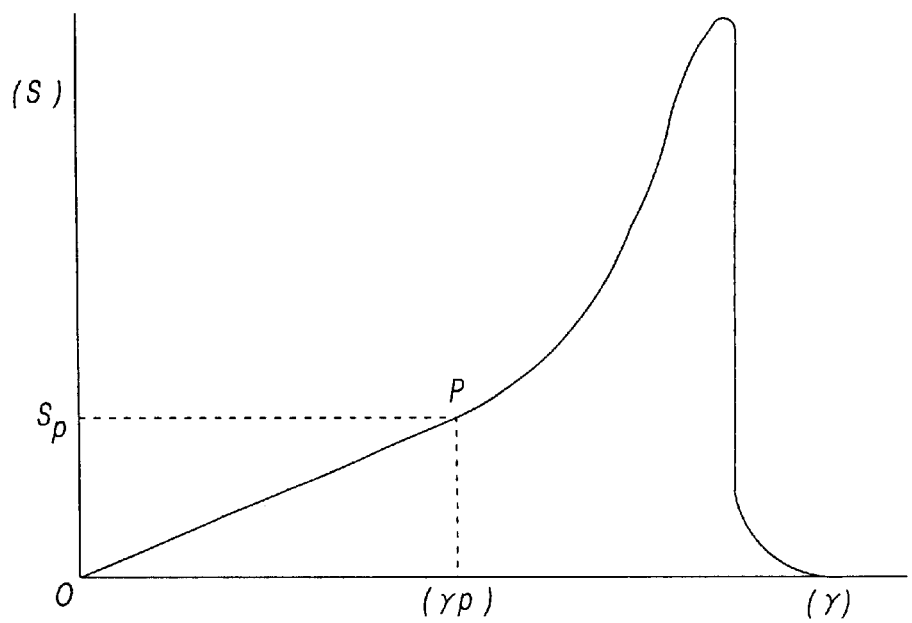
FIG. 9 is a graphic representation of an illustrative stress-strain (elongation) curve.

For a nonwoven fiber aggregate, which is held together only through the entanglement of the fibers, a straight-line relationship is generally obtained at the initial stage of the stress-strain (elongation) curve. The gradient of the straight line is calculated as the entanglement coefficient E (in meters). For example, in the illustrative stress-strain curve shown in FIG. 9 (where the vertical axis represents the stress, the horizontal axis represents the strain, and O represents the origin), the limit of straight-line relationship is represented by P, the stress at P is represented by $S_p$, and the strain at P is represented by $\gamma_p$. In such cases, the entanglement coefficient is calculated as $E=S_p/\gamma_p$. For example, when $S_p=60$ m and $\gamma_p=86\%$, E is calculated as $E=60/0.86=70$ m. It should be noted that the line OP is not always strictly straight. In such cases, the line OP is approximated by a straight line.

Although only a few exemplary embodiments have been described, the present invention is not limited to one particular embodiment. Indeed, to practice the invention in a given context, those skilled in the art may conceive of variants to the embodiments described herein (e.g., variations in sizes, structures, shapes and proportions of the various elements, values of parameters, mounting arrangements, or use of materials) without materially departing from the true spirit and scope of the invention. Various modifications may be made to the details of the disclosure without departing from the spirit of the invention.

The cleaning sheet of the present invention can be manufactured using commercially available techniques, equipment and material. In addition, the cloth may be used on a variety of surfaces such as plastic, wood, carpet, fabric, glass and the like.

Cleaning implements and methods of cleaning surfaces using the cleaning sheet are also provided herein. The cleaning implement may be produced as an intact implement or in the form of a cleaning utensil kit. Intact implements include gloves, dusters and rollers. Kits according to the present invention, which are designed to be used for cleaning surfaces, commonly include a cleaning head and a cleaning sheet capable of being coupled to the cleaning head. In addition, the kit can include a yoke capable of installation on the cleaning head and an elongate handle for attachment to the yoke. Whether provided as a completely assembled cleaning implement or as a kit, the cleaning implement preferably includes a cleaning head which allows the cleaning sheet to be removably attached to the cleaning head.

What is claimed is:

1. A cleaning sheet for cleaning and removing particles from a surface, said sheet comprising:
    a particle retention layer including an electret material for collecting and retaining the particles; and
    an outer layer covering at least a portion of the particle retention layer, the outer layer comprising a low dust retention material and including a surface having a plurality of apertures formed therethrough, wherein the apertures have a cross-sectional dimension of at least about 1 mm².

2. The cleaning sheet of claim 1 wherein the particle retention layer comprises electret foam.

3. The cleaning sheet of claim 1 wherein the particle retention layer includes a flexible polymeric sheet with at least one dust retention surface that includes a plurality of depressions and is covered by the outer layer.

4. The cleaning sheet of claim 3 wherein the flexible polymeric sheet includes the electret material.

5. The cleaning sheet of claim 1 wherein the particle retention layer includes an electret fabric.

6. The cleaning sheet of claim 5 wherein the electret fabric includes at least 20 weight % of electret fibers.

7. The cleaning sheet of claim 6 wherein the cover layer includes a thermoplastic material.

8. The cleaning sheet of claim 5 wherein the electret fabric comprises a nonwoven fabric.

9. The cleaning sheet of claim 5 wherein the electret fabric layer includes a woven fabric.

10. The cleaning sheet of claim 5 wherein the electret fabric includes at least one dust retention surface having a plurality of depressions.

11. The cleaning sheet of claim 1 wherein the particle retention has a relatively high debris retention capacity and is capable of retaining more particles than the outer layer.

12. The cleaning sheet of claim 1 coupled to a mounting structure.

13. The cleaning sheet of claim 1 having a breaking strength of at least 500 g/30 mm.

14. The cleaning sheet of claim 1 having an elongation of no more than about 25% at a load of 500 g/30 mm.

15. The cleaning sheet of claim 1 having a basis weight of about 50 to 250 g/m².

16. The cleaning sheet of claim 1 wherein the particle retention layer comprises electret fibers having a denier about 0.1 to 6.

17. The cleaning sheet of claim 1 wherein the particle retention layer includes a plurality of pores.

18. The cleaning sheet of claim 1 wherein the apertures have a combined surface area that is at least 20% of the exterior surface area of the outer layer.

19. The cleaning sheet of claim 1 wherein the outer layer includes a plurality of apertures with an average cross-sectional area of at least 1 mm².

20. The cleaning sheet of claim 1 wherein the particle retention layer has a particle retention capacity for a particle of at least about 20 g/m².

21. A cleaning utensil for collecting and retaining debris comprising
    a cleaning head;
    a cleaning sheet adapted for coupling to the head including:
    a particle retention layer including an electret material; and
    an outer layer covering at least a portion of the particle retention layer, the outer layer including a plurality of apertures having a cross-sectional dimension of at least 1.0 mm² and formed from a low dust retention material.

22. The cleaning utensil of claim 21 further comprising a yoke adapted for installation on the head.

23. The cleaning utensil of claim 22 further comprising an elongate handle adapted for attachment to the yoke.

24. A kit for cleaning surfaces and collecting and retaining debris comprising
    a cleaning head;
    a cleaning sheet adapted for coupling to the head including:
    a particle retention layer including an electret material; and
    an outer layer covering at least a portion of the particle retention layer;
wherein the outer layer includes a plurality of apertures therethrough and is formed from a low dust retention material.

25. The cleaning utensil of claim 24 further comprising a yoke adapted for installation on the head.

26. The cleaning utensil of claim 25 further comprising an elongate handle adapted for attachment to the yoke.

27. A method of cleaning a surface comprising:
    contacting the surface with a cleaning sheet including:
    a particle retention layer including electret material; and an outer layer covering at least a portion of the particle retention layer;

wherein the outer layer includes a plurality of apertures therethrough and is formed from a low dust retention material.

28. The method of claim 27 wherein debris is drawn through the apertures and is retained within the particle retention layer.

* * * * *